(12) United States Patent
Black et al.

(10) Patent No.: US 11,103,774 B2
(45) Date of Patent: Aug. 31, 2021

(54) METHOD FOR PROVIDING CUSTOMIZED BUTTON MAPPING PRE-SETS

(71) Applicant: Sony Interactive Entertainment Inc, Tokyo (JP)

(72) Inventors: Glenn Black, San Mateo, CA (US); Thomas Bruckbock, Livermore, CA (US); Jason Campbell, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/526,261

(22) Filed: Jul. 30, 2019

(65) Prior Publication Data

US 2021/0031099 A1    Feb. 4, 2021

(51) Int. Cl.
*A63F 13/22* (2014.01)

(52) U.S. Cl.
CPC .................................. *A63F 13/22* (2014.09)

(58) Field of Classification Search
None
See application file for complete search history.

(56) References Cited

U.S. PATENT DOCUMENTS

| | | |
|---|---|---|
| 744,044 A | 11/1903 | Burnham |
| D441,404 S | 5/2001 | Okimoto |
| D441,405 S | 5/2001 | Okimoto |
| D635,615 S | 4/2011 | Foster et al. |
| D645,910 S | 9/2011 | Foster et al. |
| D702,194 S | 4/2014 | Cho |
| D705,741 S | 5/2014 | Porter et al. |
| D725,610 S | 3/2015 | Dasbach |
| D736,322 S | 8/2015 | Navid |
| D766,375 S | 9/2016 | Kujawski et al. |
| D784,335 S | 4/2017 | Kujawski et al. |
| D794,026 S | 8/2017 | Kujawski et al. |
| 9,804,864 B1 * | 10/2017 | Sharma ................. G06F 16/178 |
| 9,979,625 B2 | 5/2018 | McLaughlin et al. |
| D839,919 S | 2/2019 | Valluripalli et al. |
| D886,101 S | 6/2020 | Pai |
| 2004/0023719 A1 | 2/2004 | Hussaini et al. |
| 2004/0033835 A1 | 2/2004 | Chao |
| 2011/0105231 A1 | 5/2011 | Ambinder et al. |
| 2014/0139455 A1 | 5/2014 | Argiro |

(Continued)

FOREIGN PATENT DOCUMENTS

| | | |
|---|---|---|
| TW | 201820840 A | 6/2018 |
| TW | 201905671 A | 2/2019 |

OTHER PUBLICATIONS

International Search Report & Written Opinion dated Aug. 31, 2020 for International Patent Application No. PCT/US2020/040181.

(Continued)

*Primary Examiner* — James S. McClellan
*Assistant Examiner* — Peter J Iannuzzi
(74) *Attorney, Agent, or Firm* — JDI Patent; Joshua D. Isenberg; Robert Pullman

(57) ABSTRACT

Buttons on the add-on may be mapped to controller buttons using customized button mapping pre-sets. A button mapping may indicate that a selected preset is to be hidden during a switching operation Upon receiving a switching operation input, the selected pre-set is skipped during the switching operation.

9 Claims, 8 Drawing Sheets

(56) References Cited

U.S. PATENT DOCUMENTS

| | | | | |
|---|---|---|---|---|
| 2014/0357372 A1* | 12/2014 | Garcia | .................... | A63F 13/22 |
| | | | | 463/37 |
| 2015/0105152 A1* | 4/2015 | Bellinghausen | ...... | A63F 13/214 |
| | | | | 463/31 |
| 2016/0228765 A1 | 8/2016 | Rubio | | |
| 2017/0354895 A1 | 12/2017 | Dornbusch et al. | | |
| 2018/0104574 A1* | 4/2018 | Tager | ...................... | A63F 13/22 |
| 2019/0391719 A1* | 12/2019 | Agrawal | ............... | G06F 3/0227 |
| 2020/0142488 A1 | 5/2020 | Unnikrishnan | | |

OTHER PUBLICATIONS

International Search Report and Written Opinion dated Sep. 8, 2020 for International Patent Application No. PCT/US2020/040183.

Non-Final Office Action for U.S. Appl. No. 16/526,238, dated Jun. 18, 2020.

Non-Final Office Action for U.S. Appl. No. 16,526,293, dated Jun. 29, 2020.

Non-Final Office Action for U.S. Appl. No. 26/699,929, dated Aug. 21, 2020.

U.S. Appl. No. 29/699,929 to So Morimoto and Arthur Kwun entitled "Controller Add-On Device", filed Jul. 30, 2019.

U.S. Appl. No. 16/526,238 to Glenn Black, Tomas Bruckbock, and Arthur Kwun entitled "Controller Add-On Device with Customizable Presets", filed Jul. 30, 2019.

U.S. Appl. No. 16/526,293 to Glenn Black, Tomas Bruckbock, and Arthur Kwun entitled "Customizablecontroller Add-On System", filed Jul. 30, 2019.

Notice of Allowance for U.S. Appl. No. 16/526,238, dated Nov. 3, 2020.

Notice of Allowance for U.S. Appl. No. 16/526,293, dated Dec. 2, 2020.

Office Action dated Feb. 18, 2021 for Taiwanese Patent Application No. 109119663.

Notice of Allowance for U.S. Appl. No. 29/699,929, dated Jun. 9, 2021.

* cited by examiner

METHOD FOR PROVIDING CUSTOMIZED BUTTON MAPPING PRE-SETS

FIELD OF THE INVENTION

Aspects of the present disclosure are related to game controllers. Specifically aspects of the present disclosure are related to game controller add-ons.

CROSS-REFERENCE TO RELATED APPLICATIONS

This application is related to co-pending U.S. patent application Ser. No. 16/526,238, to Glenn Black, Tomas Bruckbock, and Arthur Kwun entitled "CONTROLLER ADD-ON DEVICE WITH CUSTOMIZABLE PRESETS", filed the same day as the present application, the entire contents of which are incorporated herein by reference.

This application is related to co-pending U.S. patent application Ser. No. 16/526,293, to Glenn Black, Tomas Bruckbock, and Arthur Kwun entitled "CUSTOMIZABLE CONTROLLER ADD-ON SYSTEM", filed the same day as the present application, the entire contents of which are incorporated herein by reference.

This application is related to co-pending U.S. Design patent application Ser. No. 29/699,929 to So Morimoto and Arthur Kwun entitled "CONTROLLER ADD-ON DEVICE", filed the same day as the present application, the entire contents of which are incorporated herein by reference.

BACKGROUND OF THE INVENTION

Current game controllers have many buttons that are assigned functions by an application running on a computer or a video game console. Additionally, current game controllers have multiple types of buttons that operate in various different ways to better match the role to which they are assigned by the application. For example, a controller may have joysticks, a directional pad (d-pad), shoulder buttons, touch screens, and action buttons. Despite a heavy emphasis on ergonomic design, a number of buttons on the game controller may be out of reach for the average hand while using certain functions.

Thus, there is a need in the art, for a way to add more buttons to a game controller that are within the reach of the user while using certain functions.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Device

Figure 1:
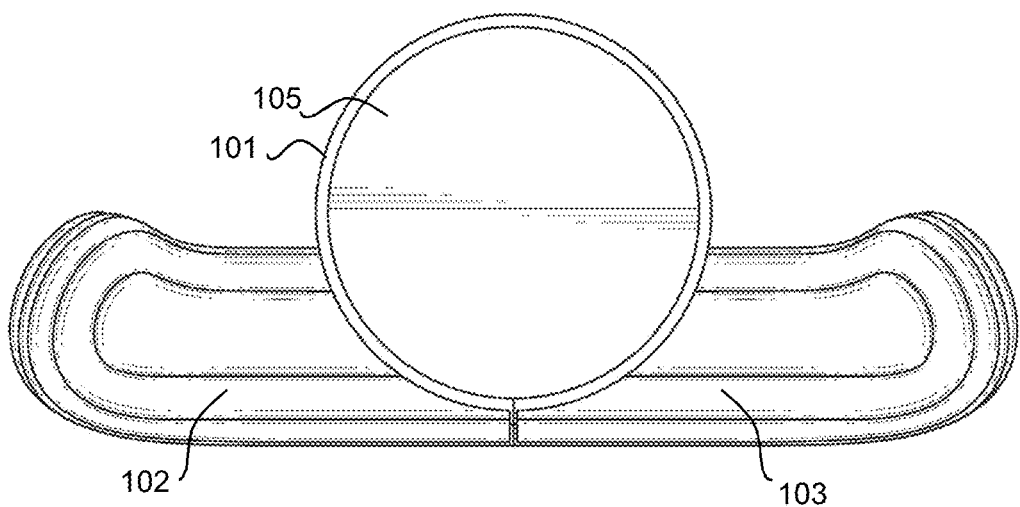
FIG. 1 is a bottom view diagram of a controller add-on device according to an aspect of the present disclosure.

The present disclosure describes a controller add-on device configured to add additional customizable buttons to a controller. FIG. 1 depicts a bottom view of the controller add-on device. The controller add-on device comprises a housing 101 which is configured to couple to mechanically connect to the body of a controller. The housing also serves as a rigid attachment point for a plurality of buttons. Shown in FIG. 1 the add-on device comprises a right customizable button 102 and a left customizable button 103 but the scope of the present disclosure is not so limited. The plurality buttons 102, 103 are configured to be within reach of a user's index, middle or ring fingers while holding the body of the game controller.

Figure 2:
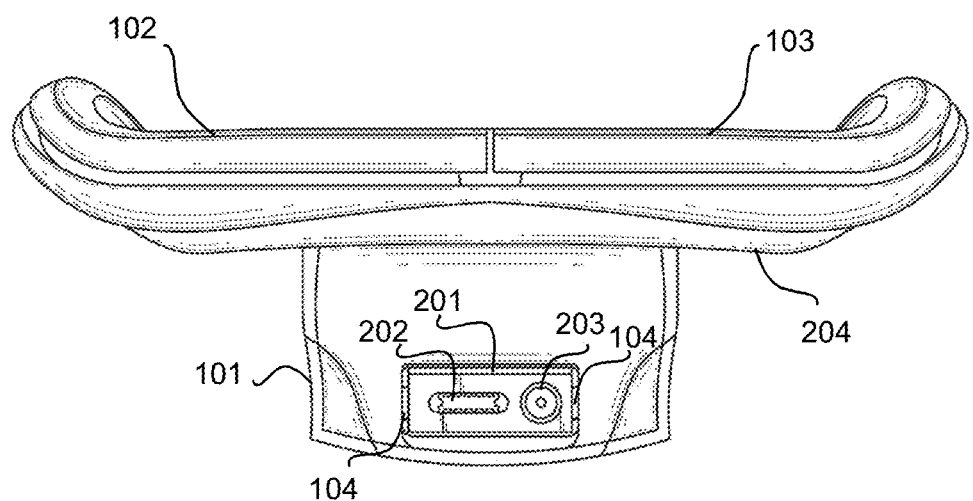
FIG. 2 is a front view diagram of a controller add-on device according to an aspect of the present disclosure.

In some embodiments a portion of the housing 101 that includes the customizable buttons 102, 103 may be coupled to the housing by way of a hinged controller interface 201, seen in FIG. 2. Alternatively, the customizable buttons may be mechanically connected to the housing by way of attachment to a switch mounted to a printed circuit board, the printed circuit board coupled to the housing by, e.g., screws, pins, glue, plastic hot-stakes, clips, or housing elements. In some embodiments, the controller add-on may have a display screen 105. The display screen 105 may be coupled to the housing by way of rigid attachment means. The display screen may be associated with, e.g., mechanically incorporated into, an input interface, e.g., a mechanical button. Additionally the display screen may include user interface elements as touch screen, such as a capacitive touch screen or a resistive touch screen. In implementations where add-on includes the display screen 105 and the buttons 102, 103 and the input interface may be configured to be within reach of a user's index, middle or ring fingers while holding the body of the game controller. In some implementations, the input interface and/or buttons may be within reach of the user's thumbs, as well.

In other embodiments, display screen may be replaced by other communication elements such as a speaker connected to a printed circuit board attached to the housing by rigid attachment means. In alternative embodiments the user interface may feature a plurality of lights. In additional embodiments the user interface may comprise both a display screen and a speaker. In some embodiments the display screen is connected to a printed circuit board attached to the housing by rigid attachment means. In other additional embodiments the speaker is attached to the housing by rigid attachment means.

FIG. 2 depicts a front view of the controller add-on device. As shown the housing 101 provides a cavity, which is configured to fit a controller body. A controller interface mount 201 is coupled to the housing 101. The controller interface mount 201 may be rotatably coupled to the housing 101, e.g., by a hinge 104. The controller interface mount 201 comprises one or more controller interfaces, e.g., an analog interface 202 and a digital interface 203. These one or more controller interfaces are configured to communicatively couple the controller the plurality of buttons 102, 103 to the controller. Additionally, the controller interface mount 201 is configured to tilt with from a first position in which the add-on device can make a physical and mechanical connection with the body of the game controller to a second position in which a portion of the housing 101 conformally contacts the body of a game controller. The one or more controller interfaces may include, e.g., Serial connectors, Universal Serial Bus interfaces (USB), co-axial jack (co-ax), audio jack, S/PDIF connector, parallel connector and the like. The housing may also have a conformal surface 204 located opposite the surface having the buttons 102, 103. The conformal surface 204 is configured to make conformal contact with a controller body. The conformal surface may include a pliable material to dampen vibration from button presses as well as to provide a solid contact surface with the controller body. The pliable material may be any suitable material such as rubber, silicone, soft plastic, leather, and the like.

Figure 3:
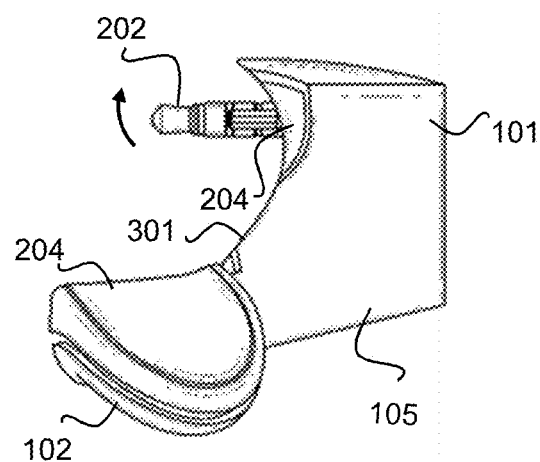
FIG. 3 is a right side view diagram of a controller add-on device according to an aspect of the present disclosure.
Figure 6:
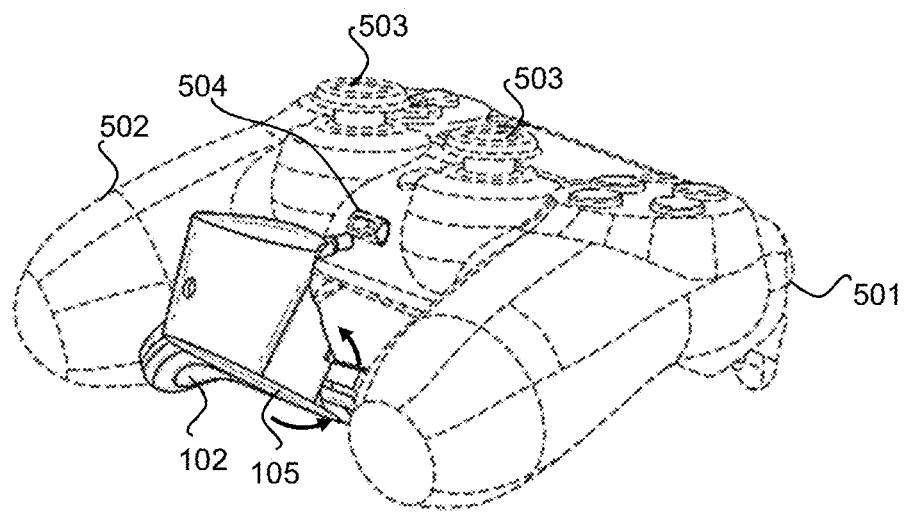
FIG. 6 is a left side view diagram of a controller add-on device mounted to a controller according to an aspect of the present disclosure.

FIG. 3 depicts a side view of the controller add-on device. As can be seen, the one or more controller interfaces 202, 203 extend outward from the housing 101. The housing has a curved portion 301 to better conform to the shape of the controller when mounted. The curved portion 301 in conjunction with the tilting interface mount 201 also allows the controller add-on devices to be placed in a first position to make physical and mechanical connection with the body of the controller, e.g., as depicted in FIG. 6, and then tilted to a second position to make conformal contact with the body of the game controller, as depicted, e.g., in FIG. 8. The curved arrow in FIG. 3 indicates the direction of tilt of the interface mount 201 to go from the second position to the first position.

Figure 4:
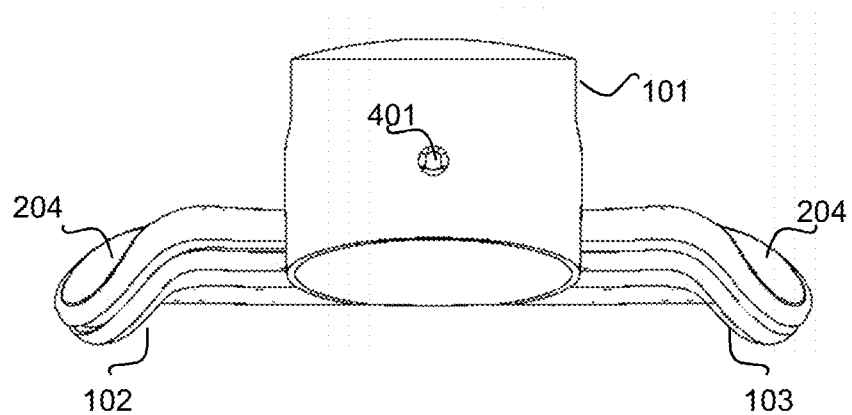
FIG. 4 is a top view diagram of a controller add-on device according to an aspect of the present disclosure.

FIG. 4 depicts a back view of the controller add-on device. This view shows an (optional) communication interface port 401. This communication interface port 401 may be used to relay signals from the controller to additional devices such as headphones or other user interfaces. The communication interface port may also receive signals from devices such as microphones or other user interfaces and relay those signals back to the controller. The communication interface port 401 may be of a similar type as the one or more communication interfaces 202, 203.

Figure 5:
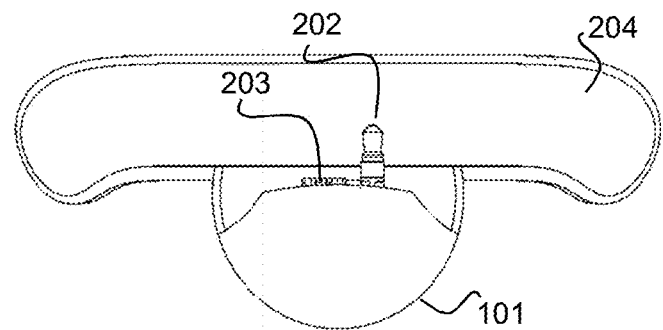
FIG. 5 is a back view diagram of a controller add-on device according to an aspect of the present disclosure.

As seen in the top-down view of the controller add-on device in FIG. 5, one or more communication interfaces 202, 203 may be coupled to the housing 101 so that the communication interfaces extend outward from the housing over the conformal surface 204.

Figure 7:
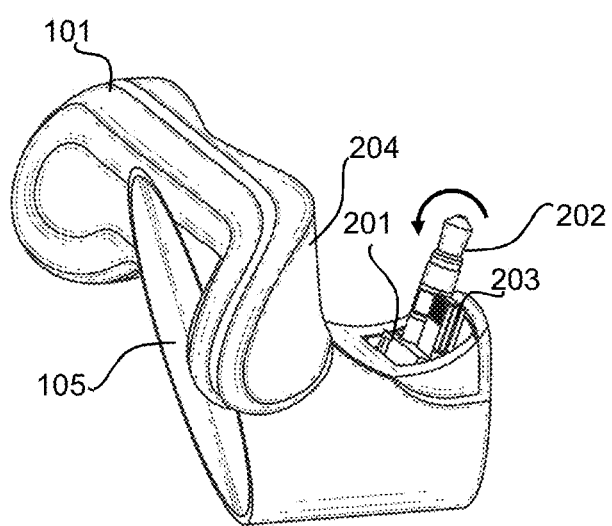
FIG. 7 is a three-dimensional diagram of a controller add-on device according to an aspect of the present disclosure.

FIG. 6 depicts a side view of the orientation of the controller add-on device when initially coupled with a controller 501 (indicated by dashed lines). As shown, the tilting interface mount 201 allows the housing 101 to be tilted downward relative to the controller 501 when the analog interface 202 and the digital interface 203 connects to corresponding interfaces 504 on the controller. In the depicted implementation, the housing 101 is configured to fit securely between the two handholds 502 of the controller and not interfere with the joysticks 503. After connection is made, the tilting interface mount 201 allows the housing 101 to tilt upward toward the controller 501 in the direction indicated by the arrow so that the conformal surface 204 opposite the plurality of buttons 102, 103 can make conformal contact with the bottom of the controller. The curved arrow in the three-dimensional diagram of a controller add-on device shown in FIG. 7 indicates the direction of relative movement of the tilting interface mount 201 as the device rotates from the first position in which connection is made to the controller and the second position in which the conformal surface 204 conforms to the bottom of the controller.

Figure 8:
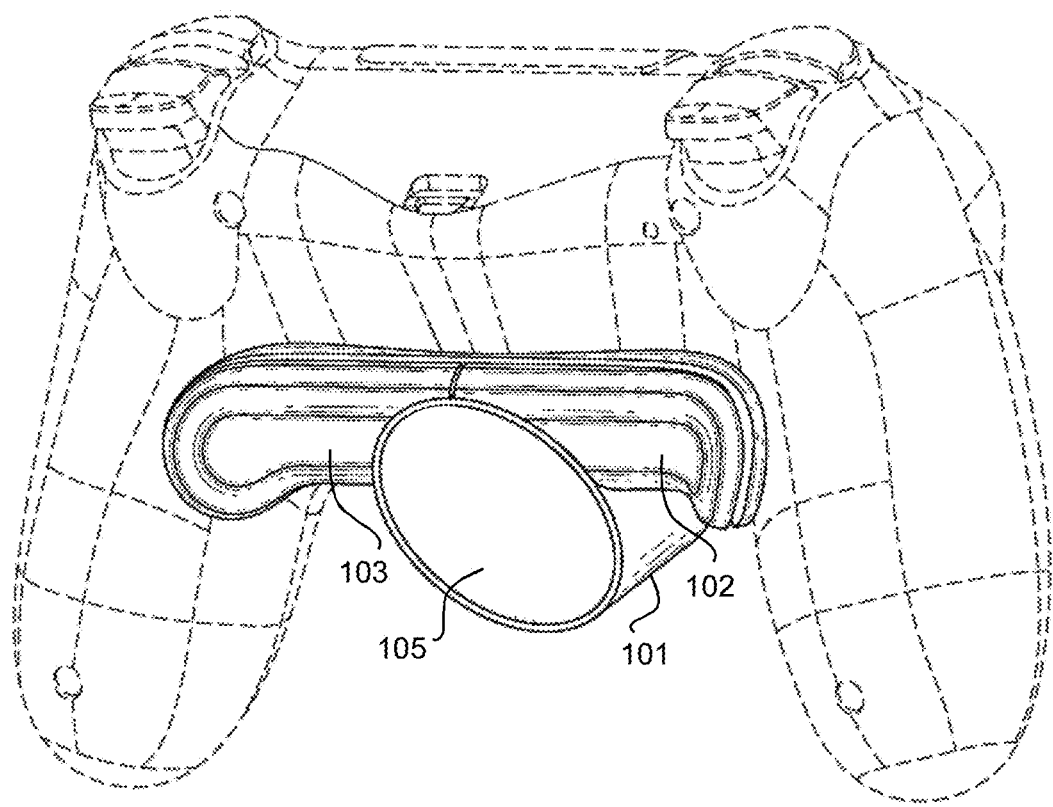
FIG. 8 is a bottom view diagram of a controller add-on device mounted to a controller according to an aspect of the present disclosure.

FIG. 8 depicts a bottom view of the controller add-on device when coupled with a controller in the operational position. As shown, the controller add-on device is positioned between the two handholds of the controllers and the plurality of buttons 102, 103 on the controller add-on device are configured to be within reach of a user's index, middle or ring fingers while holding the body of the game controller. The housing 101 is configured to fit on a side of the controller body opposite the two joysticks 503 so that operation of the buttons does not affect operation of the joysticks. The display screen 105 may be configured to face downward and be easily viewed when the controller body 503 is turned upside down. This can be advantageous when the display screen has an associated input device, e.g., a button or touch interface that can be operated by the user. While the depicted embodiment shows a display screen 105 mounted in the downward position when the controller add-on device is couple to the controller body 503, the scope of this disclosure is not so limited. In other embodiments, the display screen may be configured face upward or frontward while the controller add-on device is coupled to the controller body.

Operation

Figure 9:
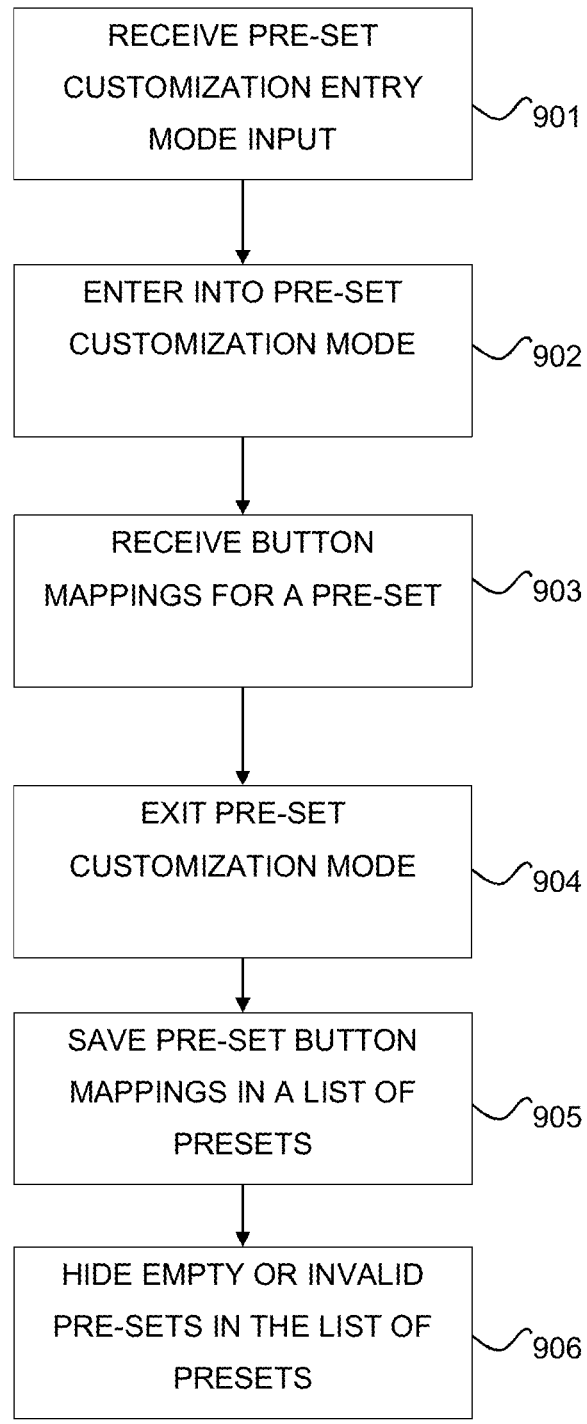
FIG. 9 is a block diagram of a method for entering button mapping presets according to an aspect of the present disclosure.

The flow diagram of FIG. 9 illustrates a method for pre-set generation with a controller add-on device according to aspects of the present disclosure. The method begins when a pre-set customization entry mode input is received, as indicated at 901. The pre-set customization entry mode input may be a button press, a combination of button press or a selection using a touch screen. The pre-set customization entry mode allows users to map the plurality of buttons of the controller add-on to the buttons or inputs of the controller. The pre-set customization mode allows button mappings to be saved as pre-sets and creates the ability for the user to easily switch between pre-sets when the controller add-on device is not in pre-set customization entry mode. Upon receiving pre-set customization entry, mode input the controller add-on device enters the pre-set customization entry mode 902. The user may begin mapping keys by selecting a controller button and choosing a button of the plurality buttons 102, 103 of the controller add-on to represent that controller button and provide that button's input when pressed. The controller add-on device receives this mapping from the user, as indicated at 903. The mapping may be performed using a user interface such as an input device incorporated into the display screen 105 or may be performed using a separate program running on a host device such as a game console or a computer. The button mapping may be created, as a pre-set in a list of pre-set, each pre-set in the list of pre-set may be blank before the user creates a button mapping or may be set to a default button mapping that can be change easily by the user. Alternatively, new button mapping preset may be created by the user and added to a list of pre-sets that may unpopulated.

Upon creation of a button mapping pre-set the user may select to exit the pre-set customization entry mode. The user may take the necessary action to exit the pre-set customization mode, this action is received the controller add-on device and subsequently the controller add-on device exits the pre-set customization entry mode 904. According to aspects of the present disclosure, the user may exit the pre-set customization mode by pressing an exit button or entering series of button presses or selection an option within a user interface. Alternatively, the user may exit the pre-set customization mode by refraining from pressing a button for a period. In some implementations, the exit button may be implemented using an input device, e.g., touch interface or mechanical button associated with the display screen 105.

After exiting the pre-set customization entry mode, the controller add-on device saves the pre-set or presets entered by the user 905. The pre-set or pre-sets entered by the user may be saved to a list of pre-sets stored in the memory of the controller add-on device. A very useful feature of the present disclosure is that after the pre-set entered by the user to the list of pre-sets the device may hide or otherwise makes un-selectable pre-sets that are empty, invalid or chosen to be hidden 906. This allows users to quickly switch between valid pre-sets during operation of the controller add-on device, e.g., using a button or touch interface that can be operated by the user. This mode of operation can be advantageous if the display screen and associated input device face away from the user during operation. Reducing the available modes to a relatively small number, e.g., two, makes it easy for the user to toggle between them without having to look at the screen.

Figure 10:
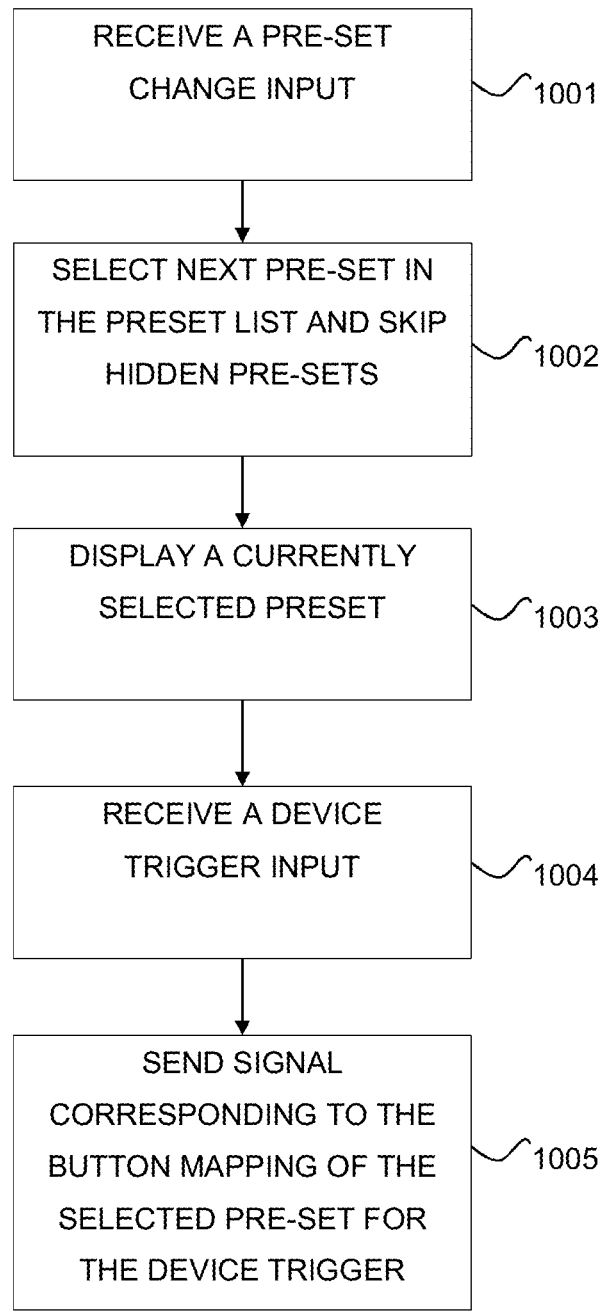
FIG. 10 is a block diagram of a method for switching mapped button presets according to an aspect of the present disclosure.

FIG. 10 depicts the method for switching between pre-sets according to aspects of the present disclosure. During operation of the controller, add-on device the user may desire to switch between two or more different presets on the preset list. To do this the user may press a button or a series of button, or make a selection using a touch screen. The controller add-on device receives the pre-set change input from the user 1001. Subsequently the controller add-on device selects the next pre-set in the pre-set list and applies that configuration to the plurality buttons 1002. A feature of the present disclosure is where, the next pre-set in the pre-set list is blank, invalid or otherwise hidden, the controller add-on device will skip that pre-set in the list and select the next pre-set instead. Additionally the user interface of the controller add-on device will display the selected pre-set 1003. After selection of a button mapping pre-set a button, press by the user on one of the plurality of button 1004 triggers the pre-set button mapping. The pre-set button mapping sends a signal corresponding to the signal of the mapped button in the selected pre-set to the controller 1005. This signal is received by the controller, which interprets the signal as a button press for the mapped button.

By way of example and not by way limitation a pre-set button mapping may map an X-button of a game pad controller to the left button 102 and a O-button to the right button 103 of the controller add-on. When a user presses the left button 102 of the controller add-on device, the device sends a signal to the controller that the X-button has been pressed. The controller interprets this signal as though the X-button on the game pad controller has been pressed and communicates the X-button press signal to the game console.

As used herein, two objects, devices, or systems are "communicatively coupled" when information can be transmitted from one object to a second object by way of some form of signal. By way of example the signal may be an electric signal delivered through an electrically conductive interface, a mechanical signal delivered through a mechanical interface, an acoustic signal delivered through a sound-transmitting medium, or an electromagnetic signal such as a radio signal, microwave signal or a light signal, which may be delivered through a medium, such as a fiber-optic medium, a waveguide, or through free space. Communicative coupling encompasses the use of intermediary objects, devices, and systems such as transducers, transmitters, amplifiers, receivers, and signal processors, e.g., digital signal processors.

Communicative coupling is a distinct concept from mechanical connection, though the two concepts are not mutually exclusive. As a non-limiting example, communicative coupling via mechanical interface may between two objects be distinguished from mechanical connection of the two objects. For example, an actuating stud on one component may press a button on a second object when the two objects are connected by means of screws. The stud-button interaction provides mechanical communicative coupling, while the screws provide mechanical connection.

System

Figure 11:
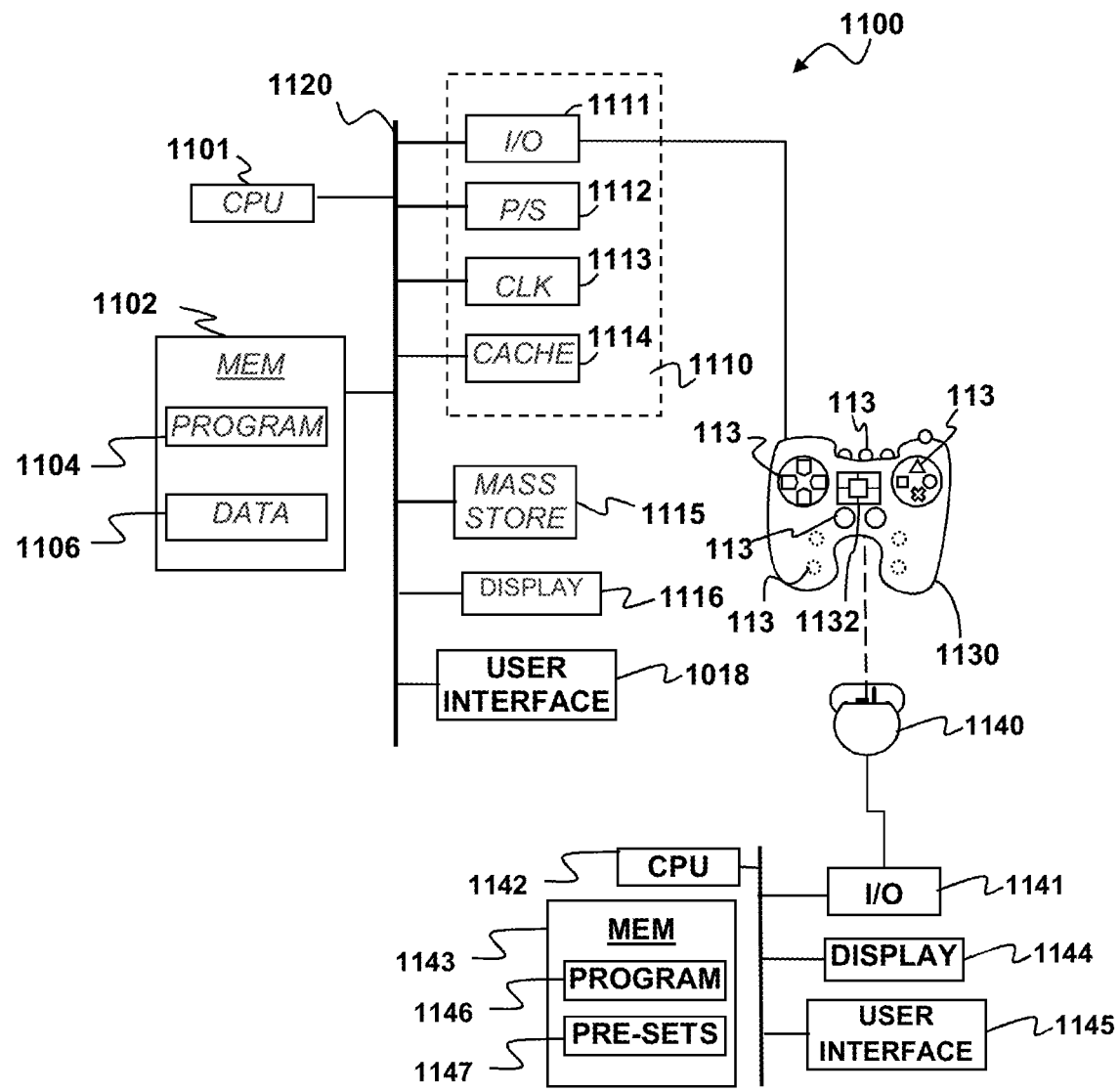
FIG. 11 is a block system diagram of a controller add-on device connected to a computing system according to an aspect of the present disclosure.

According to embodiments of the present invention, a system with a controller having a controller add-on device and method of the type described above may be implemented as depicted in FIG. 11. A system 1100 may include a processor 1101 and a memory 1102 (e.g., RAM, DRAM, ROM, and the like). In addition, the system 1100 may have multiple processors 1101 if parallel processing is to be implemented. The memory 1102 includes data 1106 and game program code 1104, which may include portions that are configured as described above. Specifically, the memory 1102 may include button mapping pre-set data 1106, which may include a stored pre-set list. The memory 1102 may also contain programs for switching pre-sets and programs for pre-set creation 1104.

The system 1100 may also include well-known support functions 1110, such as input/output (I/O) elements 1111, power supplies (P/S) 1112, a clock (CLK) 1113 and cache 1114. The apparatus 1100 may optionally include a mass storage device 1115 such as a disk drive, CD-ROM drive, tape drive, or the like to store programs and/or data. The controller may also optionally include a display unit 1116 and user interface unit 1118 to facilitate interaction between the controller 1100 and a user. The display unit 1116 may be in the form of a cathode ray tube (CRT) or flat panel screen that displays text, numerals, graphical symbols or images. The user interface 1118 may include a keyboard, mouse, joystick, light pen or other device. In addition, the user interface 1118 may include a microphone, video camera or other signal-transducing device to provide for direct capture of a signal to be analyzed. The processor 1101, memory 1102 and other components of the system 1100 may exchange signals (e.g., code instructions and data) with each other via a system bus 1120.

A microphone array 1122 may be coupled to the system 1100 through the I/O functions 1111. An optional image capture unit 1123 (e.g., a digital camera) may be coupled to the apparatus 1100 through the I/O functions 1111. One or more pointing actuators 1125 that are mechanically coupled to the camera may exchange signals with the processor 1101 via the I/O functions 1111.

As used herein, the term I/O generally refers to any program, operation or device that transfers data to or from the system 1100 and to or from a peripheral device. Every data transfer may be regarded as an output from one device and an input into another. Peripheral devices include input-only devices, such as keyboards and mice, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a solid state drive (SSD), CD-ROM drive, CD-R drive or internal modem or other peripheral such as a flash memory reader/writer, hard drive.

In certain embodiments of the invention, the system 1100 may be a video game unit, which may include a controller 1130 coupled to the processor via the I/O functions 1111 either through wires (e.g., a USB cable) or wirelessly. Additionally in other embodiments, the system 1100 may be a computer system with a peripheral controller 1130. The controller 1130 may have analog joystick controls 1131 and conventional buttons 1133 that provide control signals commonly used during playing of video games. Such video games may be implemented as processor readable data and/or instructions from the program 1104, which may be stored in the memory 1102, or other processor readable medium such as one associated with the mass storage device 1015.

The controller 1130 may include one or more inertial sensors 1132, which may provide position and/or orientation information to the processor 1101 via an inertial signal. Orientation information may include angular information such as a tilt, roll or yaw of the controller 1130. By way of example, the inertial sensors 1132 may include any number and/or combination of accelerometers, gyroscopes or tilt sensors. In addition, the joystick controller 1130 may include one or more light sources 1134, such as light emitting diodes (LEDs). The light sources 1134 may be used to distinguish one controller from the other.

The processor 1101 may use inertial signals from the inertial sensors 1132 in conjunction with optical signals from light sources 1034 detected by an image capture unit to deduce information on the location and/or orientation of the controller 1030 and/or its user.

The controller add-on device 1140 couples to the controller 1130 through an interface port on the controller (not shown). The controller add-on device may communicate with the controller 1130 and the game console 1100 through I/O functions 1141, which are coupled to the communication interface. The controller add-on device may comprise a processor 1142 and memory 1143 as well as a display 1144 and a user interface 1145. The user interface may comprise a plurality buttons for example a left button a right button and a touch screen or mechanical button associated therewith. The memory 1143 may contain programs 1146 which when carried out by the processor 1142 cause the controller add-on device to enact methods for entering a button mapping pre-set 1147, e.g., as shown FIG. 9 or the method for switching button mapping pre-sets, e.g., as shown in FIG. 10. The programs 1146 may also enact a button-mapping scheme for the plurality of buttons in the user interface 1145. The I/O functions 1141 may contain various connectors and ports to connect the controller add-on device 1140 to the controller and communicate with the controller 1130 and the system 1100. The I/O 1140 for example and without limitation may comprise a 3.5 mm audio jack, a serial connector, and a 3.5 mm audio port. In some embodiments and without limitation I/O may pass audio signals from the 3.5 mm audio through to the 3.5 mm audio port. Additionally in some embodiments, the controller add-on device also comprises a serial port and the I/O functions to receive signals from the serial port and pass the signals through to the game controller.

In the interest of clarity, not all of the routine features of the implementations described herein are shown and described. It will be understood by those skilled in the art that in the development of any such implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of the present disclosure.

In accordance with aspects of the present disclosure, the components, process steps, and/or data structures may be implemented using various types of operating systems; computing platforms; user interfaces/displays, including personal or laptop computers, video game consoles, PDAs and other handheld devices, such as cellular telephones, tablet computers, portable gaming devices; and/or general purpose machines. In addition, those of ordinary skill in the art will recognize that devices of a less general purpose nature, such as hardwired devices, field programmable gate arrays (FOGs), application specific integrated circuits (ASICs), or the like, may also be used without departing from the scope and spirit of the inventive concepts disclosed herein.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112, ¶ 6.

What is claimed is:

1. A method for providing customized button mapping pre-sets, comprising:
    receiving an add-on pre-set customization mode entry input;
    entering the add-on pre-set customization mode;
    receiving a button mapping for a plurality of buttons in a selected pre-set wherein the button mapping indicates the selected preset is to be hidden during a switching operation;
    exiting the add-on pre-set customization mode;
    saving the button mapping for the selected pre-set to a pre-set list;
    receiving a switching operation input;
    switching from a first pre-set on the pre-set list to a second pre-set on the pre-set list and skipping over the selected pre-set during the switching operation.

2. The method of claim 1 further comprising receiving an activation of one of the plurality of buttons and sending an input to a game controller corresponding to the button mapping of the second pre-set for the one of the plurality of buttons.

3. The method of claim 1 wherein the pre-set list contains a plurality of pre-sets.

4. The method of claim 1 further comprising displaying the first and second pre-sets on a display screen and hiding the selected preset during the switching operation.

5. The method of claim 4 wherein the display screen is a touch screen and switching operation is a touch screen, touch input.

6. The method of claim 4 wherein the display screen is a touch screen, wherein the add-on pre-set customization mode entry input is a touch screen, touch input and wherein the button mapping is selected using an activation of one of the plurality of buttons.

7. The method of claim 1 wherein the button mapping in the selected pre-set maps every button in the plurality of buttons to a null or empty button.

8. The method of claim 1 wherein a selection box indicates that the selected pre-set is hidden during the switching operation.

9. The method of claim 1 wherein each pre-set in the pre-set has a defined button mapping and where a button mapping for at least one pre-set in the pre-set list maps an activation of at least one of the plurality of buttons to a game controller input activation.

* * * * *